United States Patent [19]
Ikegaya

[11] Patent Number: 5,152,552
[45] Date of Patent: Oct. 6, 1992

[54] EMERGENCY TENSIONING DEVICE FOR AUTOMOTIVE SEAT BELT

[75] Inventor: Isao Ikegaya, Shizuoka, Japan

[73] Assignee: Fuji Kiko Company, Ltd., Japan

[21] Appl. No.: 588,008

[22] Filed: Sep. 25, 1990

[30] Foreign Application Priority Data

| Sep. 28, 1989 | [JP] | Japan | 1-113826[U] |
| Sep. 28, 1989 | [JP] | Japan | 1-253452 |
| Sep. 28, 1989 | [JP] | Japan | 1-253453 |
| Sep. 28, 1989 | [JP] | Japan | 1-253454 |

[51] Int. Cl.⁵ ............................................. B60R 22/46
[52] U.S. Cl. ..................................... 280/806; 297/480
[58] Field of Search ............... 280/806, 473; 297/480; 180/268; 297/473

[56] References Cited

U.S. PATENT DOCUMENTS

| 4,669,782 | 6/1987 | Nishiyama et al. | |
| 4,818,022 | 4/1989 | Nishimura | 297/473 |
| 4,913,497 | 4/1990 | Knabel et al. | 280/806 |
| 4,917,210 | 4/1990 | Danicek | 180/268 |
| 4,948,171 | 8/1990 | Knabel et al. | 280/806 |

FOREIGN PATENT DOCUMENTS

| 0300469 | 1/1989 | European Pat. Off. | |
| 3631780 | 4/1987 | Fed. Rep. of Germany. | |
| 3807928 | 9/1989 | Fed. Rep. of Germany. | |
| 3822253 | 1/1990 | Fed. Rep. of Germany | 280/806 |
| 61-241234 | 10/1986 | Japan. | |
| 62-289451 | 12/1987 | Japan. | |

OTHER PUBLICATIONS

McCosh, Dan, "Automotive Newsfront," Popular Science, Sep. 1989, pp. 28-29.

Primary Examiner—Karin L. Tyson
Attorney, Agent, or Firm—Ronald P. Kananen

[57] ABSTRACT

A seat belt arrangement employs a seat belt buckle pre-tensioner which includes buckle anchor supported on a structural component of a vehicular seat. The buckle anchor is formed with a ratchet or saw teeth extending along a guide slot. A seat belt buckle is connected to the buckle anchor via a connecting leg rigidly secured on the buckle and movable along the guide slot of the buckle anchor. The connecting member is cooperated with a pivotal actuation lever, which is, in turn connected to a sensor assembly which mechanically actuates the pivotal actuation lever for causing pivotal movement of the latter carrying with the connecting member for retracting the seat belt buckle in a direction for increasing tension at a seat belt web.

19 Claims, 6 Drawing Sheets

EMERGENCY TENSIONING DEVICE FOR AUTOMOTIVE SEAT BELT

BACKGROUND OF THE INVENTION

1. Field of the Invention

The present invention relates generally to a seat belt arrangement for an automotive vehicle with an emergency lock function. More specifically, the invention relates to a so-called "mechanical buckle pre-tensioner" for providing higher tension for a seat belt in response to vehicular deceleration in a magnitude greater than a predetermined magnitude.

2. Description of the Background Art

In the modern automotive technologies, emergency lock seat belt arrangements have been developed in various constructions. The emergency lock seat belt arrangement generally operates to lock a seat belt for preventing extraction of the belt in response to extraordinary magnitude of acceleration which can be caused upon collision. Such arrangement is generally successful to protect a seat occupant from colliding onto vehicular structural components upon collision impact. On the other hand, the seat belt tends to tie the seat occupant onto the seat even at the normal state. Tying up the seat occupant may lead to a feeling on the seat occupant by loss of freedom and sometimes causes an uncomfortable ride feeling. In order to improve this, some of modern seat belt arrangements are provided with a tension reducing function to permit locking the seat belt at a position extracted in a length slightly more than that required for tying the seat occupant on the seat. This reduces tightness of the belt at a normal wearing condition and thus improves ride feeling.

For establishing an emergency lock function, an emergency lock seat belt retractor is normally employed in the emergency lock seat belt arrangement. The emergency lock seat belt retractor senses as inertia moment exerted on the vehicular body and establishes locking of the seat belt when the inertia moment becomes greater than a predetermined magnitude. Some of the emergency lock seat belt retractors employ a webbing sensor which senses extraction speed of the seat belt to establish locking at an extraordinary extraction speed of the belt. With such arrangement, locking is necessarily established after extraction of a certain length of the belt. Such extra length of the belt extracted will permit a certain magnitude of movement of the seat occupant. Particularly, when the seat belt arrangement employs the aforementioned tension reducer, the magnitude of movement of the seat occupant in response to the extraordinary deceleration becomes greater. As can be appreciated, upon vehicular collision, it is preferred to tie the seat occupant on the seat without permitting any motion. Therefore, the advanced technologies utilize such type of seat belt arrangement in combination with a pre-loader which forcingly retract the belt for tying up the seat occupant with an increased tension upon collision, or with an air bag system which forms an air bag cushion for preventing the seat occupant from colliding onto the vehicular structural component in front of the seat.

Such additional equipment necessarily cause increasing of the production cost. In order to avoid this, there have been proposed mechanical buckle pre-tensioners which draw a seat belt buckle in a tensioning direction to provide additional tension for the belt. Such type of the mechanical buckle pre-tensioners have been disclosed in Japanese Patent First (unexamined) Publications 61-241234, 62-289451 and so forth, for example. The mechanical buckle pre-tensioner employs a trigger mechanism for causing a pre-tensioning operation in response to collision shock. The trigger mechanism is relatively bulky. Since the trigger mechanism needs to be associated with the seat belt buckle, the trigger mechanism is preferably facilitated in the vicinity of the seat belt buckle. This causes interference with the vehicular structural components, such as a console box or so forth. Furthermore, since the modern vehicular seat employs a seat reclining mechanism for adjusting a seat back angular position, the construction around the seat becomes complicated to cause difficulty of installation and thus causes increasing of weight and cost.

SUMMARY OF THE INVENTION

Therefore, it is an object of the present invention to provide a seat belt buckle pre-tensioner which is compact and suitable for installation with a seat back reclining mechanism.

In order to accomplish the aforementioned and other objects, a seat belt arrangement, according to the present invention, employs a seat belt buckle pre-tensioner which includes a buckle anchor supported on a structural component of a vehicular seat. The buckle anchor is formed with a ratchet or saw teeth extending along a guide slot. A seat belt buckle is connected to the buckle anchor via a connecting leg rigidly secured on the buckle and movable along the guide slot of the buckle anchor. The connecting member cooperates with a pivotal actuation lever, which is, in turn, connected to a sensor assembly which mechanically actuates the pivotal actuation lever for causing pivotal movement of the latter carrying with the connecting member for retracting the seat belt buckle in a direction for increasing tension at a seat belt web.

According to one aspect of the invention, a pre-tensioning device for a seat belt arrangement for an automotive vehicle, comprises:

a seat belt buckle assembly holding a seat belt webbing tying a seat occupant on a vehicular seat;

an anchor supporting the seat belt buckle assembly on a vehicular structural stationary component;

a lockable guide means incorporated in the anchor, the lockable guide means guiding the seat belt buckle assembly between a normal position and a pre-tensioning position at which tightness of the seat belt webbing tying the seat occupant is increased in a given magnitude; and a mechanical actuator means cooperated with the seat belt buckle assembly for normally locking the latter at the normal position, and responsive to an inertia force exerted on the vehicular body and greater than a given magnitude to instantly operate the seat belt buckle assembly to the pre-tensioning position.

The lockable guide means may comprise an elongated slot formed in the anchor, which elongated slot is formed of locking teeth along the longitudinal peripheral edge, and a toothed member connected to the seat belt buckle assembly with locking teeth engageable with the locking teeth of the slot. In such case, the mechanical actuator may include a pivotal lever connected to the toothed member at one end, a spring means biasing the pivotal lever to an actuated position corresponding to the pre-tensioning position of the seat belt buckle assembly, a spring locking means normally restricting action of the spring means to maintain at a normal and pre-loaded position, and a mechanical sensor detective of the inertia greater than the given magnitude to release restriction of the spring locking means for permitting action of the spring means to actuate the pivotal lever to the actuated position. The spring means, a spring locking means and the sensor means are preferably housed in a casing which is oriented on a substantially same vertical plane to a seat slide rail assembly of a seat slide mechanism of the automotive seat. The casing may be oriented inside of the anchor.

In the further preferred embodiment, the anchor has a lower end portion coupled with a stationary vehicular structural component so as to receive an impulsive reacting force upon actuation of the pre-tensioning device.

The anchor may be supported on a mounting bracket secured on an upper rail of a seat slide rail assembly. In such case, it is preferred that the anchor has an downward extension having a hooking lower end which is engageable with a hooking portion of a locking rail of the seat slide rail assembly. In the alternative, the anchor is rigidly secured on a base plate of a seat back reclining device.

According to another embodiment of the present invention, a seat belt arrangement for an automotive vehicle, comprises:
an emergency lock seat belt retractor for locking seat belt webbing for preventing the seat belt webbing from being further extracted in response to an inertia magnitude greater than a given value;
a seat belt buckle pre-tensioning device cooperative with the emergency lock seat belt retractor for increasing tightness of the seat belt webbing tying a seat occupant, which pre-tensioning device comprises,
a seat belt buckle assembly holding a seat belt webbing tying a seat occupant on a vehicular seat;
an anchor supporting the seat belt buckle assembly on a vehicular structural stationary component;
a lockable guide means incorporated in the anchor, the lockable guide means guiding the seat belt buckle assembly between a normal position and a pre-tensioning position at which tightness of the seat belt webbing tying the seat occupant is increased in a given magnitude; and
a mechanical actuator means cooperated with the seat belt buckle assembly for normally locking the latter at the normal position, and responsive to an inertia force exerted on the vehicular body and greater than a given magnitude to instantly operate the seat belt buckle assembly to the pre-tensioning position.

BRIEF DESCRIPTION OF THE DRAWINGS

The present invention will be understood more fully from the detailed description give herebelow and from the accompanying drawings of the preferred embodiment of the invention, which, however, should not be taken to limit the invention to the specific embodiments but are for explanation and understanding only.

In the drawings.

DESCRIPTION OF THE PREFERRED EMBODIMENT

Figure 1:
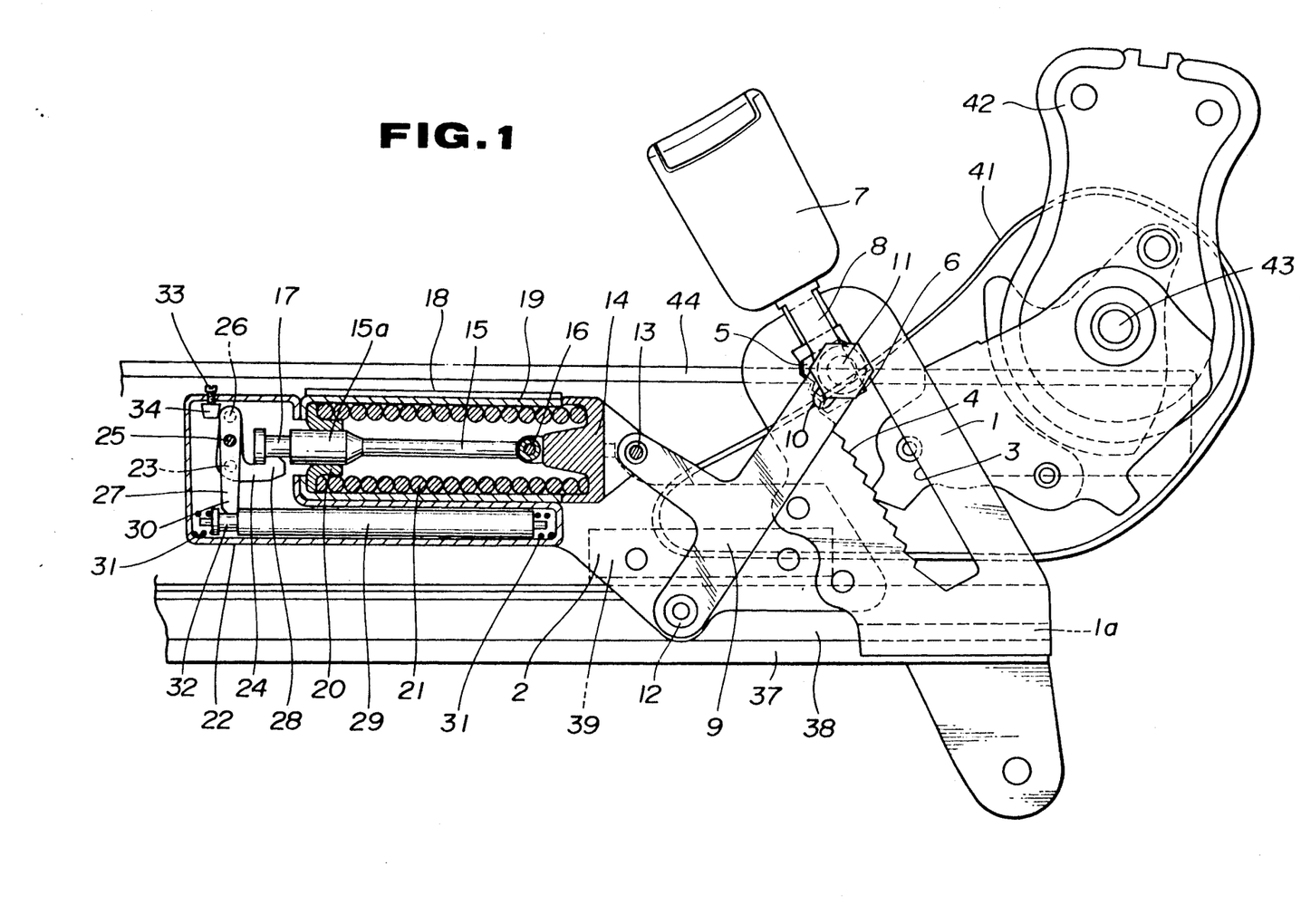
FIG. 1 is a partly sectioned side elevation of the major part of the preferred embodiment of a seat belt arrangement, according to the present invention.
Figure 2:
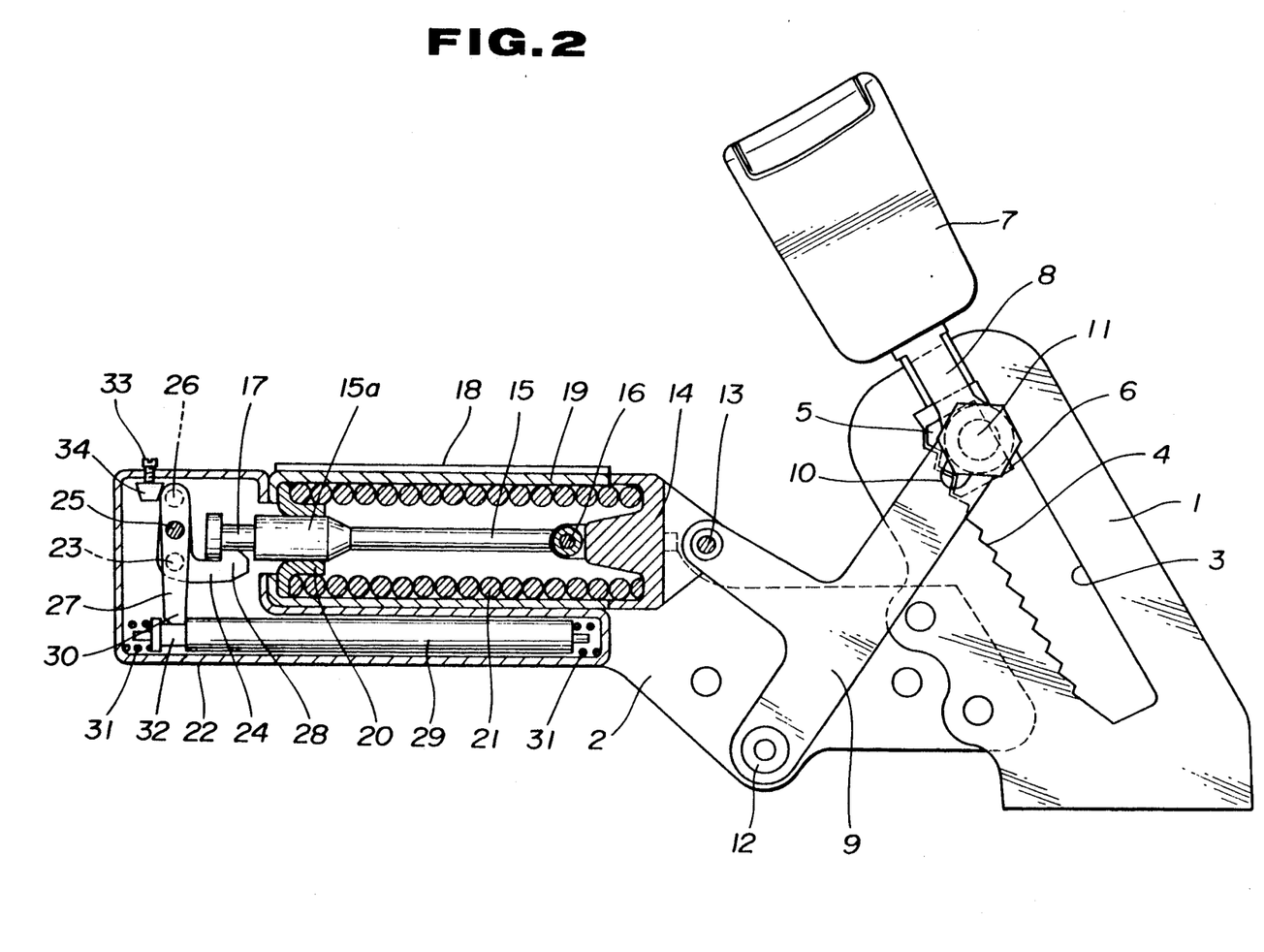
FIG. 2 is a side elevation of the preferred embodiment of a seat belt buckle pre-tensioner employed in the preferred embodiment of the seat belt arrangement of FIG. 1.
Figure 3:
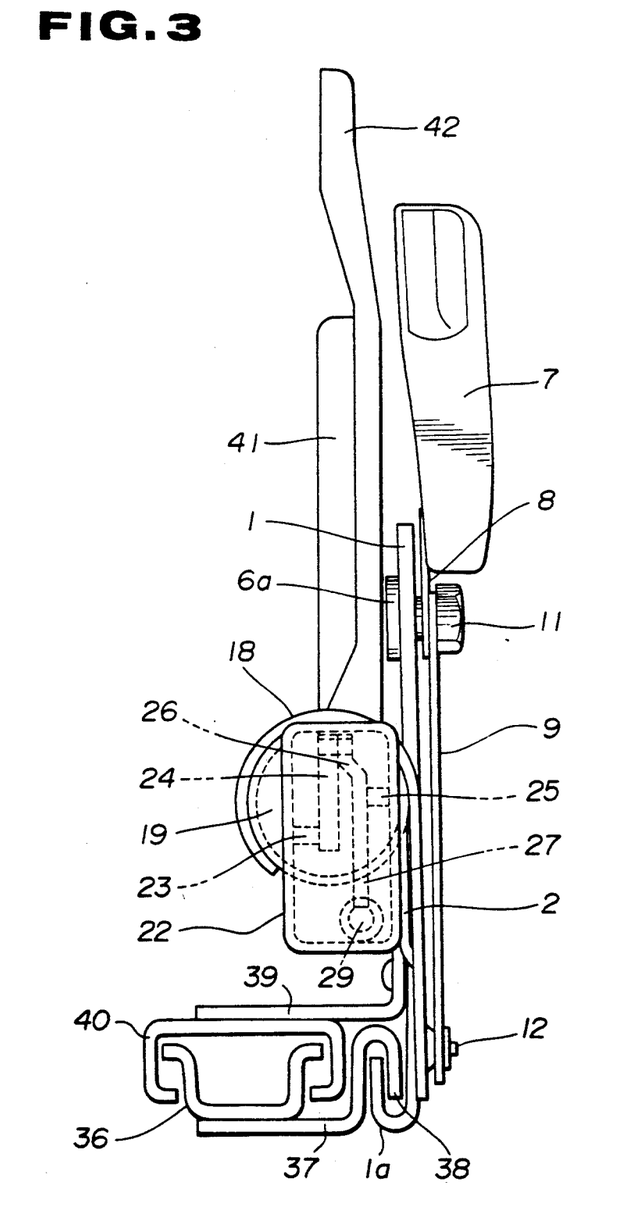
FIG. 3 is a front elevation of the major part of the preferred embodiment of the seat belt arrangement of FIG. 1.

Referring now to the drawings, particularly to FIGS. 1 to 3, the preferred embodiment of a seat belt arrangement, according to the present invention, includes the preferred embodiment of a belt buckle pre-tensioning device which is designed to retract a seat belt buckle in a belt tightening direction in response to an extraordinary magnitude of inertia moment induced by vehicular abrupt deceleration, such as collision. The belt buckle pre-tensioning device includes a buckle anchor plate 1 which is formed with an elongated slot 3 with saw teeth 4 formed along at one longitudinal side peripheral edge. The buckle anchor plate 1 is supported on an upper rail 40, best seen in FIG. 3 which forms a guide rail assembly of a seat slide mechanism together with a lower rail 36, by means of an essentially L-shaped supporting bracket 39 and a stand plate 2 which is rigidly fixed to the supporting bracket 39 and extends essentially in a vertical direction. On the other hand, the belt buckle anchor plate 1 has an essentially U-shaped hooking section 1a at the lower end thereof. The hooking section is engaged with an essentially reversed U-shaped hooking section 38 formed at the rear end of a locking rail 37 which is rigidly fixed on the floor of the vehicular body.

A seat back reclining device is mounted at the rear end portion of a seat cushion frame 44. The seat back reclining device includes a base plate 41 and other per se known components of the device. The base plate 41 of the seat back reclining device pivotally supports a seat back arm 42 for pivotal movement about a pivot shaft 43.

A belt buckle 7 is connected to the buckle anchor plate 1 via a connecting plate 6. The connecting plate 6 has a toothed projection 5 and connected to the belt buckle via a strap 8 which is rigidly fitted with the connecting member by means of a pivot bolt 11. The toothed projection 5 is disposed in the elongated slot 3. The toothed projection 5 normally engages its teeth with the saw teeth 4 formed on the longitudinal peripheral edge of the slot. As can be clearly seen from FIG. 4, the toothed projection 5 extends or projects from the surface of the connecting plate 6 opposing to the buckle anchor plate 1. The width of the toothed projection 5 is formed smaller that the width of the elongated slot 3 so as to permit the lateral shift of the toothed projection transverse to the longitudinal axis of the slot. On the other hand, the connecting plate 6 has side edge portions 6a mating with the buckle anchor plate 1 and thus serving as a guide for transverse movement of the toothed projection 5. The lateral shifting causes disengagement of the teeth of the toothed projection 5 from the saw teeth 3 of the elongated slot for permitting longitudinal movement of the connecting plate 6 carrying the belt buckle 7 along the longitudinal axis of the slot.

An essentially T-shaped actuation lever 9 has one leg formed with an elongated connection slot 10. A pivot bolt 11 connecting the strap 8 to the connecting plate 6 extends through the elongated connection slot 10 in a manner to permit pivotal movement of the actuation lever 9 thereabout. Another leg which extends in alignment with the aforementioned one leg, has an end connected to the stand plate 2 by means of a pivot shaft 12 in pivotal fashion. The a pivot shaft 12 forms stationary pivot for the actuation lever 9. The other leg which extends in a transverse relationship with respect to the remaining legs, is connected to a mechanical actuator.

The mechanical actuator includes an actuator cylinder 19 in which is disposed a bias compression spring 21. A spring seat member 14 is provided for closing one end of the actuation cylinder 19 oriented in the vicinity of the actuation lever 9. The spring seat member 14 is connected to the transversely extending leg of the actuation lever via a pivot 13. The spring seat member 14 is also connected to a guide rod 15 which extends through the actuator cylinder 9. The guide rod 15 is formed with a larger diameter section 15a sliding seated on a guide ring 20 which is provided at the other end of the actuation cylinder 9 oriented remote from the actuation lever 9. A circumferential extending groove 17 is formed on the larger diameter section 15a of the guide rod 15.

A locking lever 24 is provided adjacent the outer end of the guide rod 15 extending from the actuator cylinder 19. The locking lever 24 has a locking hook 28 engageable with the circumferential groove 17 for locking the latter at the normal position. While the guide rod 15 is locked by engagement of the locking hook 28 and the circumferential groove 17, the spring seat member 14 is placed on the associated end of the actuation cylinder 19. At this position, the bias compression spring 21 is compressed between the radially extending section of the guide ring 20 and the spring seat member 14 in a compressed fashion to accumulate spring force.

The locking lever 24 is disposed with a sensor casing 22 which is rigidly secured on the stand plate 2. The locking lever 24 is pivotally supported in the sensor casing 22 by means of a pivot 23. The locking lever 24 is cooperated with a sensor lever 27 via a connecting pin 26. The sensor lever 27 is pivotally supported in the sensor casing 22 via a pivot 25. The sensor lever 27 has an end 30 connected to a sensor mass body 29. The sensor mass body 29 is provided with a predetermined mass weight and loaded at a normal position by means of set springs 31. The sensor mass body 29 is disposed in the sensor casing 22 with orienting its longitudinal axis in parallel to the longitudinal axis of the vehicular body for sensing longitudinal acceleration exerted on the vehicle. Set spring 32 is provided a spring force corresponding a set magnitude of inertia moment so as to permit axial movement of the sensor mass body 29 in frontward direction when the longitudinally exerted inertia moment is greater than a predetermined deceleration criterion.

An externally accessible adjuster screw 33 extends through the sensor casing 22. A conical adjuster head 34 is fitted on the inner end of the adjuster screw 33. The adjuster head 34 is placed in contact with the rounded end of the sensor lever 27 for adjusting the initial position of the sensor lever.

In the construction set forth above, the guide rod 15 is normally locked at the position shown in FIGS. 1 and 2. At this condition, the spring seat member 14 is rigidly fitted onto the axial end of the actuator housing 19. Therefore, the actuator lever 19 is locked for maintaining the engagement of the toothed projection 5 of the connecting plate 6 and the saw teeth 3 of the elongated slot 4 at the upper end of the elongated slot as shown.

Figures 4, 5:
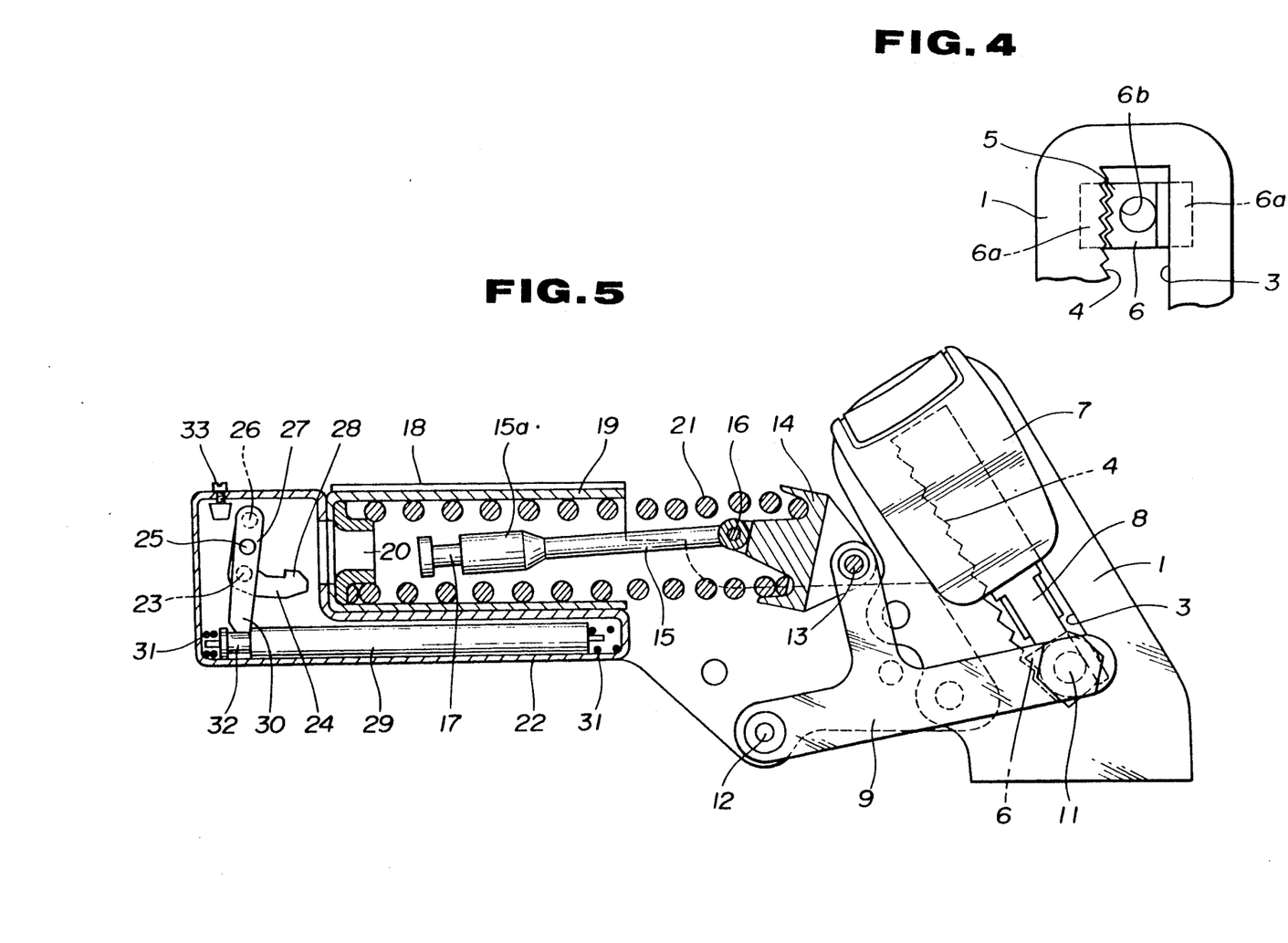
FIG. 4 is an enlarged side elevation showing interengagement between ratchet or saw teeth of a buckle anchor and a movement of a connecting member connected to a seat belt buckle.
FIG. 5 is a view similar to FIG. 2 but showing an actuating position of the seat belt buckle pre-tensioner of FIG. 2.

When an extraordinary magnitude of deceleration is caused on the vehicle due to collision or so forth, which causes a seat occupant to move to collide onto the vehicular structural components, such as an instrument panel, front windshield and so forth, the sensor mass body 29 shifts frontwardly while, overcoming the spring force of the set spring 31. Since the sensor lever 27 is connected to the sensor mass body 29 at the end 30, the sensor lever 27 is pivoted in clockwise direction about the pivot 25. Accordingly, the locking lever 24 which is connected to the sensor lever 27 via the connection pin 26, is pivoted about the pivot 23 to disengage the locking hook 28 from the circumferential groove 17 of the guide rod 15. Therefore, the guide rod 15 becomes free from restriction. The bias compression spring 21 then becomes active with the pre-loaded spring force to explosively or instantly kick the spring seat member 14 outwardly. As a result, the actuation lever 9 is swiftly pivoted in a clockwise direction to release engagement between the toothed projection 5 and the saw teeth 4 and to shift the connecting plate 6 with the toothed projection to the lower end of the slot 3.

The foregoing action of the belt buckle pretensioning device is performed in cooperation with an emergency locking seat belt retractor to causing locking of extraction of the seal belt webbing. Both of the seat belt retractor and the belt buckle pre-tensioning device act at substantially simultaneous timing. Therefore, the extracted belt length is shortened in a magnitude of the stroke of movement of the buckle as retracted by the belt buckle pre-tensioning device. As a result, the force tying the seat occupant on the vehicular seat is increased for satisfactorily and safely securing the seat occupant.

Here, it should be appreciated that when the belt buckle pre-tensioning device is in action, substantial magnitude of implosive reaction force may be exerted on the buckle anchor plate. Therefore, when the buckle anchor plate solely supports such implosive force, substantially high strength is may be required for the mounting bracket as well as the upper seat slide rail. In the shown embodiment, since the lower end 1a of the buckle anchor plate is engaged to the reversed U-shaped section 38 of the locking rail 37, part of the impulsive force may be received by locking rail. Therefore, requirement for the strength of the mounting bracket and the upper rail will not become substantial.

As can be appreciated herefrom, since the buckle anchor plate for connecting the belt buckle onto the vehicular body is utilized as a locking plate for the belt buckle pre-tensioning device, a locking plate independent of the buckle anchor plate can be neglected. Furthermore, in the shown construction, since the actuator assembly and the sensor are protruded toward the inside, i.e. into the seat cushion, interference with other vehicular structural components, such as a console box, can be successfully avoided.

While the present invention has been discussed in terms of the preferred embodiment of the invention, the present invention can be embodied in various fashion. Therefore, the invention should not be understood or interpreted to be specified to the specific embodiment of the invention but includes all possible embodiments and modifications which can be implemented without departing from the principle of the invention which is set out in the appended claims.

Figure 6:
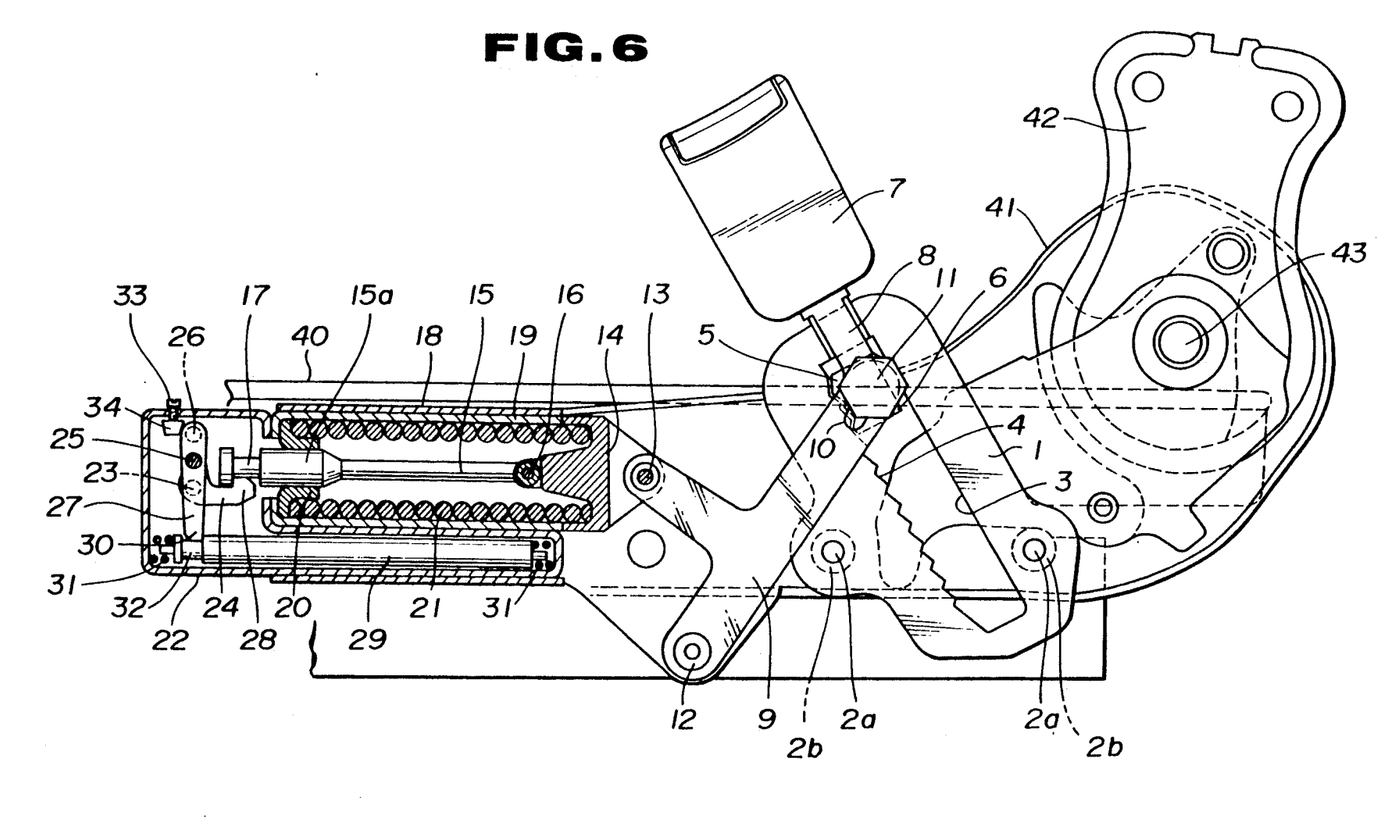
FIG. 6 is a side elevation of the major part of another embodiment of a seat belt arrangement, according to the invention.
Figure 7:
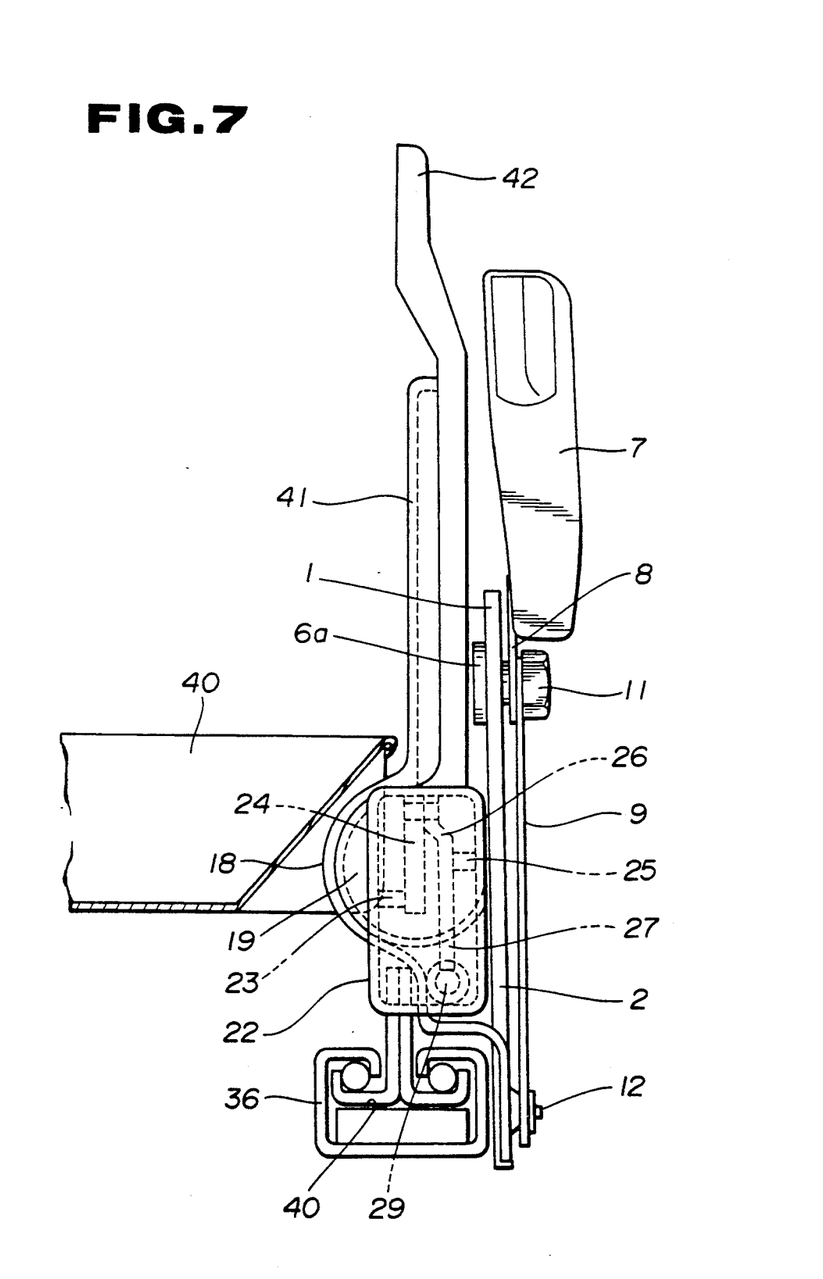
FIG. 7 is a front elevation of the embodiment of the seat belt arrangement of FIG. 6.

For example, the seat belt arrangement according to the present invention is applicable not only in combination with the specific construction of the seat slide rail assembly. For instance, as shown in FIGS. 6 and 7, in case of the shown type of the seat slide rail assembly, the buckle anchor plate 1 can be mounted on the base plate 41 of the seat back reclining arrangement. In such case, the buckle anchor plate 1 is rigidly secured on the base plate 41 by means of a plurality of rivets 2a with spacer collars 2b in a spaced apart relationship with the base plate. The remaining construction is substantially the same as that in the foregoing embodiment. Therefore, the detailed discussion will be neglected for avoiding redundant discussion.

What is claimed is:

1. A pre-tensioning device for a seat belt arrangement for an automotive vehicle, comprising:
    a seat belt buckle assembly including a seat belt buckle and a rigid strap attached to said seat belt buckle for holding a seat belt webbing tying a seat occupant on a vehicular seat, said seat belt buckle assembly having a first axis extending in parallel to the belt axis at an end connected to said seat belt buckle assembly;
    an anchor means attached to a vehicular structural stationary component;
    a pre-tensioner housing;
    guiding means for said seat belt buckle assembly between a normal position and a pre-tensioning position at which a tightness of said seat belt webbing tying the seat occupant is increased by a given magnitude, said guide means including a guide passage incorporated in said anchor and a guide member connected to said rigid strap;
    a mechanical actuator means including a force producing means and an essentially rigid actuation rod member, said rod member having a second axis intersecting said first axis at an acute angle, said rod member connected to said force producing means and being linearly movable by said force producing means along said second axis between a first position for locking said seat buckle assembly at said normal position, and a second position in response to an inertial force exerted on the vehicle body and greater than a given magnitude to instantly operate said seat belt buckle assembly to said pre-tensioning position; and
    a rigid force direction converting means pivotably disposed between said lockable guide member means and said rigid actuation rod, for converting the force of said mechanical actuator means for operating said actuation rod from said first position to said second position along said second axis into a force to be exerted on said seat belt buckle assembly along said first axis.

2. A pre-tensioning device as set forth in claim 1, wherein said lockable guide means comprises an elongated slot formed in said anchor means, said elongated slot having locking teeth along a longitudinal peripheral edge of said slot and a toothed member connected to said rigid strap of said seat belt buckle assembly, said toothed member having locking teeth engageable with said locking teeth of said slot.

3. A pre-tensioning device as set forth in claim 2, wherein said mechanical actuator means further includes a locking means for normally restricting action of said force producing means to maintain said rod member at said first position, and a mechanical sensor means responsive to said inertial force greater than said given magnitude to release restriction of said locking means for permitting action of said force producing means to actuate said rod member to said second position.

4. A pre-tensioning device as set forth in claim 3, wherein said force producing means, said locking means and said sensor means are housed in a casing which is oriented on a substantially same vertical plane relative to a seat slide rail assembly of a seat slide mechanism of the automotive seat.

5. A pre-tensioning device as set forth in claim 4, wherein said casing is oriented inside of said anchor means.

6. A pre-tensioning device as set forth in claim 1, wherein said anchor means has a lower end portion coupled with said vehicular structural stationary component so as to receive an impulsive reacting force upon actuation of the pre-tensioning device.

7. A pre-tensioning device as set forth in claim 1, wherein said anchor means is supported on a mounting bracket secured on an upper rail of a seat slide rail assembly.

8. A pre-tensioning device as set forth in claim 7, wherein said anchor means has a downward extension having a hooking lower end which is engageable with a hooking portion of a locking rail of said seat slide rail assembly.

9. A pre-tensioning device as set forth in claim 1, wherein said anchor means is rigidly secured to a base plate of a seat back reclining device.

10. A pre-tensioning device for a seat belt arrangement for an automotive vehicle comprising:
    a seat belt buckle assembly for attachment to a seat belt webbing for tying an occupant on a slidable vehicular seat, said seat belt buckle assembly including a belt buckle and connection means attached to said belt buckle;
    anchor means anchored to a structural member of said slidable vehicular seat;
    lockable guide means disposed between said anchor means and said connection means for guiding said seat belt buckle assembly between a normal position and a locked pre-tensioning position at which a tightness of said seat belt webbing tying said occupant on a vehicular seat is increased by a given magnitude;
    force providing means including a stationary member, a spring seat member, and a spring member capable of exerting a linear force, said stationary member in mechanical communication with a structural member of said sliding vehicular seat, said spring member disposed between said stationary member and said spring seat, and said spring seat member being operable between a first locked position associated with a normal position of said seat belt buckle assembly and a second unlocked position associated with said pre-tensioning position of said seat belt buckle assembly;

release means responsive to an inertial force greater than a given magnitude for releasing said spring seat from said first locked position; and a rigid force direction converting means, pivotably attached at a first position to said lockable guide means, at a second position to said spring seat, and at a third position to a structural member of said sliding vehicular seat, for converting the force of said spring member into a force on said seat belt buckle assembly wherein movement of said spring seat member between first and second positions corresponds to movement of said lockable guide means between first and second positions.

11. The pre-tensioning device of claim 10, wherein said rigid force direction converting means comprises three arms, an end of each arm corresponding to said first, second and third positions.

12. A pre-tensioning device as set forth in claim 10, wherein said lockable guide means comprises an elongated slot formed in said anchor means, said elongated slot having locking teeth along a longitudinal peripheral edge of said slot, and a toothed member connected to said rigid strap of said seat belt buckle assembly, said toothed member having locking teeth engageable with said locking teeth of said slot.

13. A pre-tensioning device as set forth in claim 12, wherein said release means comprises a spring locking means for normally restricting action of said spring member to maintain said spring seat member at said first position, and a mechanical sensor means responsive to said inertial force greater than said given magnitude to release restriction of said spring locking means for permitting action of said spring member means to actuate said spring seat member to said second position.

14. A pre-tensioning device as set forth in claim 13, wherein said spring member, said spring seat and said release means are housed in a casing which is oriented on a substantially same vertical plane relative to a seat slide rail assembly of a seat slide mechanism of the automotive seat.

15. A pre-tensioning device as set forth in claim 14, wherein said casing is oriented inside of said anchor means.

16. A pre-tensioning device as set forth in claim 10, wherein said anchor means has a lower end portion coupled with said structural member so as to receive an impulsive reacting force upon actuation of the pre-tensioning device.

17. A pre-tensioning device as set forth in claim 10, wherein said anchor means is supported on a mounting bracket secured on an upper rail of a seat slide rail assembly.

18. A pre-tensioning device as set forth in claim 17, wherein said anchor means has a downward extension having a hooking lower end which is engageable with a hooking portion of a locking rail of said seat slide rail assembly.

19. A pre-tensioning device as set forth in claim 10, wherein said anchor means is rigidly secured to a base plate of a seat back reclining device.

* * * * *